(12) United States Patent
Leon et al.

(10) Patent No.: US 11,498,499 B2
(45) Date of Patent: Nov. 15, 2022

(54) AUTOMATIC AND USER INITIATED ISOLATION TESTING FOR AUTOMOTIVE ALTERNATING CURRENT POWER SYSTEMS

(71) Applicant: Ford Global Technologies, LLC, Dearborn, MI (US)

(72) Inventors: Manuel Leon, Ecatepec (MX); Beatriz Barrios Rodriguez, Mexico City (MX); Tania Cristina Vazquez, Mexico City (MX); Jesus Guadarrama, Amecameca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 17/166,841

(22) Filed: Feb. 3, 2021

(65) Prior Publication Data

US 2022/0242339 A1    Aug. 4, 2022

(51) Int. Cl.
*B60R 16/03*    (2006.01)
*H02M 7/44*    (2006.01)

(52) U.S. Cl.
CPC ............... *B60R 16/03* (2013.01); *H02M 7/44* (2013.01)

(58) Field of Classification Search
CPC .................................. B60R 16/03; H02M 7/44
See application file for complete search history.

(56) References Cited

U.S. PATENT DOCUMENTS

| | | | |
|---|---|---|---|
| 2,207,202 A | 7/1940 | LaDeau | |
| 2,554,598 A | 5/1951 | Storch | |
| 2,922,925 A | 1/1960 | Gerrard | |
| 3,222,663 A | 1/1965 | Dennis | |
| 7,560,935 B2 | 7/2009 | Morimoto | |
| 8,768,563 B2 | 7/2014 | Nitzberg et al. | |
| 9,274,159 B2 | 3/2016 | Wang | |
| 10,168,231 B2 | 1/2019 | Pollock et al. | |
| 10,501,032 B2 * | 12/2019 | Secord | H01R 25/003 |
| 2009/0026837 A1 * | 1/2009 | Lee | H02J 9/061 363/24 |
| 2009/0278547 A1 | 11/2009 | Acena et al. | |
| 2016/0258820 A1 | 9/2016 | Pollock et al. | |
| 2018/0126932 A1 * | 5/2018 | Secord | H01R 25/003 |

(Continued)

FOREIGN PATENT DOCUMENTS

| | | |
|---|---|---|
| CN | 101413984 B | 4/2009 |
| DE | 102013016397 A1 | 7/2014 |

(Continued)

*Primary Examiner* — Jared Fureman
*Assistant Examiner* — Duc M Pham
(74) *Attorney, Agent, or Firm* — Frank Lollo; Brooks Kushman P.C.

(57) ABSTRACT

A vehicle inverter is arranged to transform direct current power from a power supply to alternating current power for an outlet. The inverter includes a transformer electrically connected between the power supply and outlet, a resistive element that can be selectively electrically connected in parallel with the transformer via a multiway switch to establish a direct electrical connection between the power supply and outlet, and a controller that selectively commands the multiway switch to close according to values indicative of resistance between the power supply and outlet before and after the multiway switch is closed.

20 Claims, 2 Drawing Sheets

(56) References Cited

U.S. PATENT DOCUMENTS

| | | | |
|---|---|---|---|
| 2019/0043671 A1 | 2/2019 | Galisultanov et al. | |
| 2020/0366079 A1* | 11/2020 | Telefus | H02H 3/08 |
| 2021/0376634 A1* | 12/2021 | Smith | H02M 1/007 |

FOREIGN PATENT DOCUMENTS

| | | |
|---|---|---|
| EP | 3052912 A1 | 4/2015 |
| HU | 190278 B | 4/1984 |
| WO | 2015049510 A1 | 4/2015 |

\* cited by examiner

AUTOMATIC AND USER INITIATED ISOLATION TESTING FOR AUTOMOTIVE ALTERNATING CURRENT POWER SYSTEMS

TECHNICAL FIELD

The present disclosure relates to the control of automotive power systems and access by users to the power provided by the same.

BACKGROUND

Vehicles may include energy storage systems (e.g., batteries) that provide power for propulsion via electric machines. They may also include energy storage systems that provide power for users accessible via an outlet. That is, a user may plug a load into their vehicle.

Ground-fault circuit interrupters are sometimes used at power outlets. The ground-fault circuit interrupter is integrated with the power outlet and tracks the current flowing in the circuit to sense fluctuations in real-time. If it detects a change in the electrical flow in the circuit, it will cut off the flow of electricity.

SUMMARY

A power system for a vehicle includes an electrical power outlet, a power supply, a transformer electrically connected between the electrical power outlet and power supply, and circuitry to obtain a value indicative of resistance between the electrical power outlet and a chassis of the vehicle. The power system also includes a first controller to selectively establish a direct electrical path in parallel with the transformer and between the electrical power outlet and power supply such that the resistance is lower during presence of the direct electrical path and higher during absence of the direct electrical path provided the electrical power outlet is galvanically isolated from the power supply during the absence of the direct electrical path.

A method of controlling an inverter of an automotive vehicle includes, responsive to user input, establishing a direct electrical path in parallel with a transformer of the inverter and between an electrical power outlet of the automotive vehicle and a power supply of the automotive vehicle. The transformer is electrically connected between the electrical power outlet and the power supply. The method also includes selectively preventing power flow from the power supply to the transformer according to values indicative of resistance, between the electrical power outlet and a chassis of the automotive vehicle that shares a common ground with the power supply, during presence and absence of the direct electrical path.

A vehicle power system includes an inverter to transform direct current power from a power supply to alternating current power for an outlet. The inverter includes a power converter electrically connected between the power supply and outlet, a resistive element to be selectively electrically connected in parallel with the power converter via a multiway switch to establish a direct electrical connection between the power supply and outlet, and a controller to selectively command the multiway switch to close according to values indicative of resistance between the power supply and outlet before and after the multiway switch is closed.

DETAILED DESCRIPTION

Figure 1:
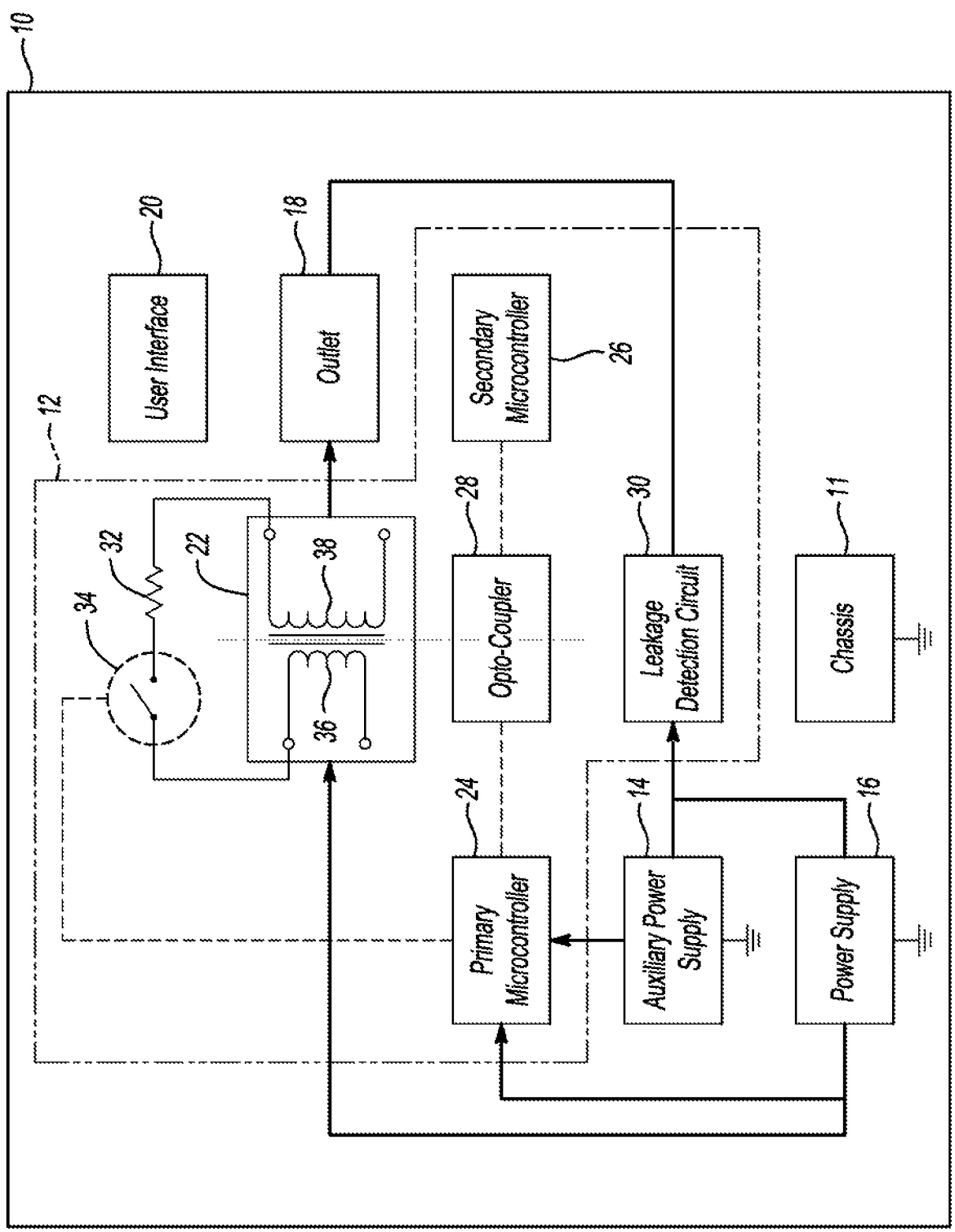
FIG. 1 is a schematic diagram of a vehicle power system.

Detailed embodiments are disclosed herein. They, however, are merely examples and may be embodied in various and alternative forms. The figures are not necessarily to scale. Some features may be exaggerated or minimized to show details of particular components. Specific structural and functional details disclosed herein are not to be interpreted as limiting, but merely as a representative basis for teaching one skilled in the art.

Some vehicles may be equipped with alternating current (AC) power systems in which customers can connect appliances that require AC power, similar to the mains on household AC outlets. Certain in-vehicle AC power systems may be designed to support relatively small loads, such as 150 W or 400 W, via one or two outlets that are accessible from the interior of the vehicle only.

Newer vehicle level AC power systems, however, may provide higher AC power levels, such as 2 kW and others, and provide multiple outlets that can be accessed from inside or outside the vehicle. These systems that are able to deliver more power will allow customers, for example, to plug in power tools and the like. Power tools may have a metal frame and if it is grounded by ineffective isolation, a break in the grounding system may occur without the user's knowledge.

Some AC power systems may not include mechanisms to notify the customer regarding certain issues associated with their use of AC power, and may not allow the customer to test the AC power system to confirm proper operation. Moreover, household outlets that include ground-fault circuit interrupters provide the functionality associated therewith. Household outlets that do not include ground-fault circuit interrupters do not provide such functionality.

It may be expensive to use ground-fault circuit interrupters for all vehicle outlets. And, use of such may not be practical. It may be possible to arrange ground-fault interrupter circuitry at an output of a vehicle inverter, but such may give rise to other issues in the case of extended wires or in the case of multiple splices in the circuit beyond the ground-fault interrupter circuitry.

Here, use of galvanic isolation to prevent unintended current flow between the primary side (e.g., low direct current (DC) voltage input) and the secondary side (e.g., high voltage AC output to connected devices) is considered. This galvanic isolation isolates the functional sections of the electrical system to prevent current flow as no direct conduction path is permitted. Energy or information, however, can still be exchanged between the sections. In one example, an isolation/step-up transformer of a power converter provides coupling via magnetic flux. The primary and secondary windings of the transformer are not connected to each other, which prevents current flow between low voltage and high voltage sides of the circuit. An opto-coupler at the inverter transmits information by light waves. The sender (light source) and receiver (photosensitive device) are not electrically connected. A leakage detection circuit measures the isolation resistance between the vehicle chassis (including low voltage circuitry) and high voltage terminals. If the galvanic isolation is lost, it can prevent different issues from arising. The inverter, for example, may shut off.

A galvanic isolation monitor in another example may actively measure the isolation resistance between the vehicle chassis (including low DC voltage input) and high voltage terminals (high voltage AC output to connected devices). A galvanic isolation tester (through current, voltage, or resistance) may also provide feedback to the internal system and/or user. To this end, an interface similar to the ones in ground-fault circuitry interrupter outlets may be provided to cease power conversion if a ground path is detected, to allow users to test if the mechanism that detects faults is working properly, and to detect if an internal component/customer device is experiencing issues.

By using galvanic isolation monitoring, a software/hardware solution can be implemented in some situations within the AC power system to continuously monitor isolation presence between low and high voltage sides. The AC power system may test its mechanism to detect galvanic isolation losses prior to providing AC output by using an isolation tester that can be used on-demand. If the mechanism is found capable to detect the loss of isolation faults, the module is allowed to provide AC output. If the initial power up sequence passes, but the system detects an issue at some point while providing AC output, the system may stop providing AC output, set a fault flag, notify the user about the issue, and/or provide the option to reset the system. If the issue persists, AC output may not be allowed in that activation or key cycle. If the initial power up sequence passes, and at some point the customer decides to test for current leakage (as can be done in certain household outlets), the AC power system may command the isolation tester to inject a fault for commanded testing purposes. If the mechanism is found capable to detect the loss of isolation faults, the module may cease power conversion until the customer resets the system. If during the test (prior to providing AC output or responsive to user request) the mechanism is found unable to detect the fault, the module may enter a faulty mode and not provide AC output in that activation or key cycle, set an internal fault message, and/or notify the user about the issue.

Thus, certain strategies contemplated herein propose to add a mechanism to detect ground paths in automotive inverters, to test if the mechanism works prior providing AC output or on-demand, and/or to notify customers about issues. This may allow users to test, monitor, and be notified about current leakage situations. Some AC power systems may thus be capable of injecting a fault on demand (simulating a galvanic isolation loss for self-testing purposes) to confirm the system is active and be able to detect current leakage, to detect isolation losses on the internal AC inverter system or externally in user devices connected to the AC system output to detect a ground path, to shut down the AC output if a galvanic isolation loss has been detected to avoid issues even if no load has been connected, to report isolation losses to notify customers about issues (internal or external), and/or to re-enable AC output on demand if the source of isolation fault has been removed.

These arrangements may detect faults in three zones, while ground-fault circuit interrupters only detect faults in one zone: issues external to the vehicle. Some of the proposed systems can detect issues even prior to connecting an appliance to the AC outlets. The first zone includes the inverter and the DC/AC module. The issues that may be detected include a short circuited transformer (DC to AC) and a high voltage short circuit with the low voltage side. The second zone includes other vehicle side components. The issues that may be detected include a short circuited harness, a short circuited outlet, and short circuited connectors at the battery, inverter, or outlets. The third zone includes components outside the vehicle. The issues that may be detected include faulty loads.

The systems contemplated herein may be more robust than ground-fault circuit interrupters, even if there are many splices. As mentioned above, ground-fault circuit interrupters may experience issues in circumstances in which circuitry beyond the ground-fault circuit interrupters has multiple splices. The proposed mechanism that detects isolation losses can be tested automatically every time the inverter starts providing AC output. In contrast, ground-fault circuit interrupter outlets are typically tested manually. The proposed strategies may improve the issue notification to the user via vehicle displays and telltales, as it indicates the type of fault detected.

The proposed power systems may offer certain benefits including alerting the user to certain issues, reducing cost as compared to ground-fault circuit interrupter solutions, and providing the ability to test on-demand prior to providing AC power.

Referring to FIG. 1, a vehicle 10 includes a chassis 11, an inverter 12, an auxiliary power supply 14 (e.g., a 12 volt battery), a power supply 16 (e.g., an alternator, 24 volt battery, a charging control system, etc.), at least one outlet 18, and a user interface 20 (e.g., a virtual button, a physical switch, a display screen, etc.). Responsive to a user plugging a load such as a power tool into the at least one outlet 18, the inverter 12 will convert DC power from the power supply 16 to AC power for the outlet 18 as discussed in further detail below.

The inverter 12 includes a transformer 22 (e.g., an isolation/step-up transformer), a primary controller 24, a secondary controller 26, an opto-coupler 28, a leakage detection circuit 30, a resistive element 32 (e.g., a resistor), and a multiway switch 34 (e.g., a relay, a solid state transistor, a switch, etc.). The transformer 22 is electrically connected between the power supply 16 and outlet 18, and includes a pair of coils 36, 38 arranged in typical fashion to provide isolation and to step-up voltage of power from the power supply 16. That is, the coil 36 is electrically connected with the power supply 16 and the coil 38 is electrically connected with the outlet 18. The coils 36, 38 galvanically isolate the power supply 16 and outlet 18 under normal circumstances. Thus, the chassis 11, power supplies 14, 16, and primary microcontroller 24 are also galvanically isolated from the outlet 18, user interface 20, and secondary microcontroller 26.

The resistive element 32 is in series with the multiway switch 34 such that, responsive to the multiway switch 34 being closed, the resistive element 32 will be in parallel with the transformer 22: One terminal of the resistive element 32 will be electrically connected with the coil 36, and the other terminal of the resistive element 32 will be electrically connected with the outlet 18. This, as discussed in further detail below, will permit automatic or selective testing of the leakage detection circuit 30 to ensure it is operating properly.

The leakage detection circuit 30 is electrically connected between the power supplies 14, 16, that power the leakage detection circuit 30, and outlet 18. It includes typical components, such as a resistance measurement circuit, and provides a high resistance path between the power supplies 14, 16 and outlet 18 provided the outlet 18 is properly isolated from the power supplies 14, 16.

The opto-coupler 28 permits communication between the primary and secondary microcontrollers 24, 26 while maintaining isolation as light is used to bridge the gap. That is, the opto-coupler 28 converts electric communication signals from the primary microcontroller 24 to light, transmits this light across a gap, and converts the received light back to electric communication signals for the secondary controller 26. The reverse is also true for communication from the secondary microcontroller 26 to the primary microcontroller 24.

The secondary microcontroller 26 is in communication with the outlet 18 and the opto-coupler 28, as mentioned above. Status of the outlet 18 (e.g., plugged-in, not plugged-in, etc.) can be communicated to the primary controller 24.

More generally, controllers, electronic modules, and other components in the vehicle 10 may communicate via one or more vehicle networks, which may include a plurality of channels. One of the channels may include discrete connections between modules and may include power signals from the auxiliary power supply 14. Different signals may be transferred over different channels. Certain communication or control signals may be transferred over a high-speed channel while other communication or control signals may be transferred over a low speed channel. The one or more vehicle networks may thus include any hardware and software components that aid in transferring signals and data between modules.

The power supplies 14, 16 and the chassis share a common ground. Given that the power supplies 14, 16 are electrically connected with the leakage detection circuit 30 and share a common ground with the chassis 11, a loss of isolation between, for example, the chassis 11 and outlet 18 will be detected by the resistance measurement circuit of the leakage detection circuit 30 as a low resistance between the chassis 11 and outlet 18. In such circumstances, the leakage detection circuit 30 can communicate such information to the primary controller 24, which can prevent power from the power supply 16 from flowing to the transformer 22, and ultimately the outlet 18.

The primary microcontroller 24 further exerts control over the multiway switch 34. Responsive to information, for example, that the vehicle 10 has been activated and prior to permitting power to flow from the power supply 16 to the transformer 22, the primary microcontroller 24 may command the multiway switch 34 to close—placing the resistive element 32 in parallel with the transformer 32, directly electrically connecting the coils 36, 38 together, and eliminating the galvanic isolation therebetween. Provided the leakage detection circuitry 30 is properly operating, it should detect a low resistance between the chassis 11 and outlet 18. When such low resistance is reported to the primary microcontroller 24 as expected, the primary microcontroller 24 may command the switch 34 to open—reestablishing the galvanic isolation. The microcontroller 24 may then permit power to flow from the power supply 16 to the transformer 22, and ultimately to the outlet 18.

In circumstances in which the leakage detection circuitry 30 is not properly operating, it may not detect a low resistance between the chassis 11 and outlet 18 even though the multiway switch 34 is closed. When such low resistance is not reported to the primary microcontroller 24 as expected, the primary microcontroller 24 may command the switch 34 to open and prevent power flow from the power supply 16 to the transformer 22. The primary microcontroller 24 may also command the user interface 20 to display an alert related to the same.

As mentioned above, the user interface 20 may provide a virtual or physical button that permits a user to request that the primary controller 24 close the multiway switch 34. That is, the user may at their discretion also test as to whether the system is operating properly. Responsive to information that the user has made such a request via the user interface 20, the primary microcontroller 24 may command the multiway switch 34 to close. Provided the leakage detection circuitry 30 is again properly operating, it should detect a low resistance between the chassis 11 and outlet 18. When such low resistance is reported to the primary microcontroller 24 as expected, the primary microcontroller 24 may command the switch 34 to open, command the user interface 20 to display data related to the same, and permit power to flow to the transformer 22.

Figure 2:
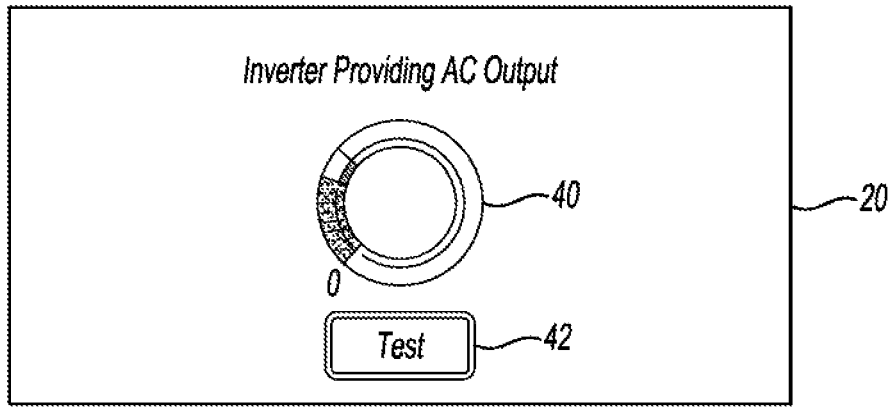
FIGS. 2 through 4 are examples of displayed output associated with the user interface of the vehicle power system of FIG. 1.
Figure 3:
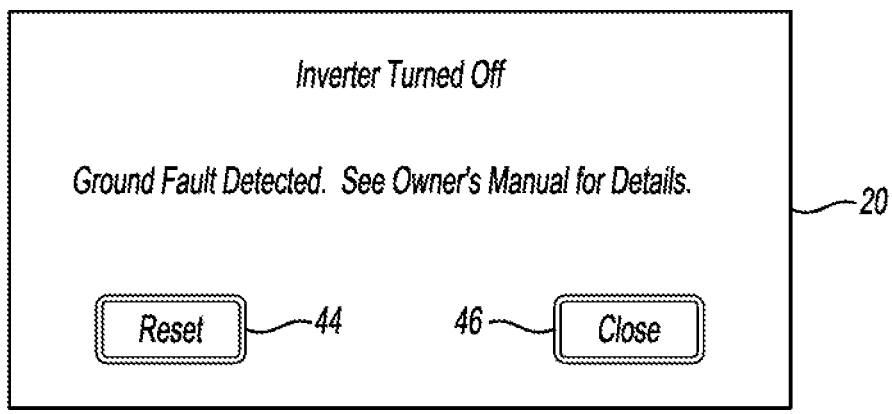
Figure 4:
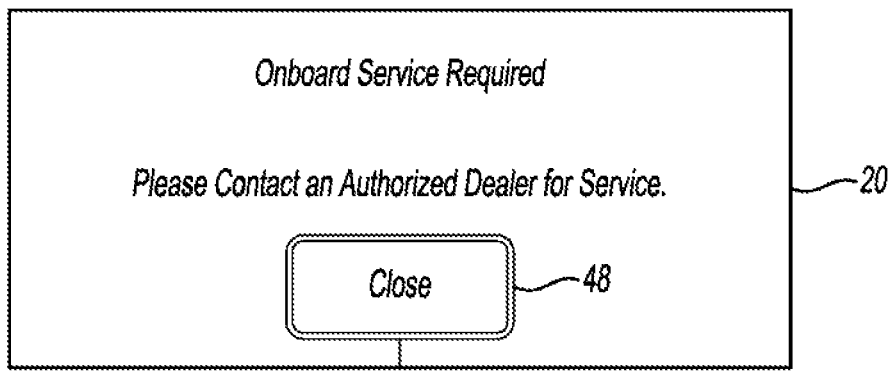

Referring to FIGS. 2, 3, and 4, various output may be provided to a user via the user interface 20. With reference to FIG. 2, the user interface 20, for example, may display a graphic indicating whether the inverter 12 is providing AC output and a "Test" button 42 that permits the user to selectively test whether the leakage detection circuit 30 is operating properly as described above. With reference to FIG. 3, the user interface 20 may indicate that the inverter 12 has been turned off and that a ground fault has been detected as a result of a successful test or a loss of galvanic isolation due to an internal or external fault. A "Reset" button 44 and "Close" button 46 may also be provided. The "Reset" button 44 permits the user to reset the system to remove the user's intentionally created fault so that the inverter 12 may continue to provide AC power. The "Close" button 46 permits the user to exit this feature via the user interface 20. Additionally the user interface 20 may be useful when there is a galvanic isolation loss due to an internal or external issue. For the "Reset" to take place, the user needs to disconnect any device experiencing an issue and then press the "Reset" button. If the fault is internal, after some retries, the user interface 20 may indicate that service is required. With reference to FIG. 4, the user interface 20 may indicate that service is required and direct the user to contact an authorized service person as a result of an unsuccessful test or an issue with the system. A "Close" button 48 may also be provided. Similar to the "Close" button 46, the "Close" button 48 permits the user to exit this feature via the user interface 20.

Predefined thresholds that define the low and high resistances mentioned above with respect to the resistance measurement circuit of the leakage detection circuit 30 can be determined via testing and driven by design considerations for particular applications. Additional, applicable standards may also inform selection of predefined thresholds used to determine whether the resistance between the chassis 11 and outlet 18 is low or high, etc.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While example embodiments are described above, it is not intended that these embodiments describe all possible forms encompassed by the claims. The words used in the specification are words of description rather than limitation, and it is understood that various changes can be made without departing from the spirit and scope of the disclosure. The word controller, for example, can refer to a single controller or several controllers collectively.

The features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A power system for a vehicle comprising:
   an electrical power outlet;
   a power supply;
   a transformer electrically connected between the electrical power outlet and power supply;
   circuitry configured to obtain a value indicative of resistance between the electrical power outlet and a chassis of the vehicle; and
   a first controller configured to selectively establish a direct electrical path in parallel with the transformer and between the electrical power outlet and power supply such that the resistance is lower during presence of the direct electrical path and higher during absence of the direct electrical path provided the electrical power outlet is galvanically isolated from the power supply during the absence of the direct electrical path.

2. The power system of claim 1 further comprising an interface configured to permit a user to request the first controller to establish the direct electrical path.

3. The power system of claim 2, wherein the first controller is further configured to generate output for the interface based on the value in the presence of the direct electrical path and the value in the absence of the direct electrical path.

4. The power system of claim 1, wherein the first controller is further configured to prevent power flow from the power supply to the transformer based on the value during the presence of the direct electrical path and the value during the absence of the direct electrical path.

5. The power system of claim 1, wherein the first controller is further configured to establish the direct electrical path responsive to indication the vehicle has been activated.

6. The power system of claim 1 further comprising a second controller configured to communicate with the electrical power outlet, and an opto-coupler configured to facilitate communication between the first and second controllers via light.

7. The power system of claim 1 further comprising a resistive element and a multiway switch, and wherein the first controller is configured to selectively establish the direct electrical path by commanding the multiway switch to close.

8. The power system of claim 1, wherein the power supply is configured to power the circuitry and first controller.

9. The power system of claim 1 further comprising an auxiliary power supply configured to power the circuitry and first controller, wherein the auxiliary power supply and chassis share a common ground.

10. The power system of claim 1, wherein the power supply and chassis share a common ground.

11. A method of controlling an inverter of an automotive vehicle, comprising:
    responsive to user input, establishing a direct electrical path in parallel with a transformer of the inverter and between an electrical power outlet of the automotive vehicle and a power supply of the automotive vehicle, wherein the transformer is electrically connected between the electrical power outlet and the power supply; and
    selectively preventing power flow from the power supply to the transformer according to values indicative of resistance, between the electrical power outlet and a chassis of the automotive vehicle that shares a common ground with the power supply, during presence and absence of the direct electrical path.

12. The method of claim 11 further comprising, responsive to indication the automotive vehicle has been activated, establishing the direct electric path.

13. The method of claim 11 further comprising generating output for an interface of the automotive vehicle based on the values.

14. The method of claim 11, wherein the establishing includes commanding a multiway switch to close.

15. A vehicle power system comprising:
    a vehicle inverter configured to transform direct current power from a power supply to alternating current power for an outlet, wherein the inverter includes
    a power converter electrically connected between the power supply and outlet,
    a resistive element configured to be selectively electrically connected in parallel with the power converter via a multiway switch to establish a direct electrical connection between the power supply and outlet, and
    a controller configured to selectively command the multiway switch to close according to values indicative of resistance between the power supply and outlet before and after the multiway switch is closed.

16. The vehicle power system of claim 15, wherein the inverter further includes circuitry configured to obtain the values.

17. The vehicle power system of claim 15, wherein the controller is further configured to command the multiway switch to close responsive to user input.

18. The vehicle power system of claim 15, wherein the controller is further configured to command the multiway switch to close responsive to vehicle activation.

19. The vehicle power system of claim 15, wherein the inverter includes another controller and an opto-coupler configured to facilitate communication between the controllers via light.

20. The vehicle power system of claim 15, wherein the power supply shares a common ground with a vehicle chassis.

\* \* \* \* \*